(12) United States Patent
King

(10) Patent No.: US 6,321,000 B1
(45) Date of Patent: Nov. 20, 2001

(54) OPTICAL EQUALIZER

(75) Inventor: Jonathan Paul King, Epping (GB)

(73) Assignee: Nortel Networks Limited, Saint Laurent (CA)

( * ) Notice: Subject to any disclaimer, the term of this patent is extended or adjusted under 35 U.S.C. 154(b) by 0 days.

(21) Appl. No.: 09/209,387

(22) Filed: Dec. 1, 1998

(51) Int. Cl.[7] .............. G02F 1/035; H01S 3/00; H04B 10/04
(52) U.S. Cl. ............... 385/24; 385/3; 359/181; 359/183; 359/188; 359/333
(58) Field of Search ................ 385/24, 3, 15; 359/333, 341, 181, 183, 188

(56) References Cited

U.S. PATENT DOCUMENTS

| | | | |
|---|---|---|---|
| 4,829,598 | * | 5/1989 | Auracher et al. ............ 455/619 |
| 5,392,377 | * | 2/1995 | Auracher ..................... 385/24 |
| 5,694,498 | * | 12/1997 | Manasson et al. ............ 385/15 |
| 5,953,467 | * | 9/1999 | Madsen ....................... 385/15 |
| 6,067,180 | * | 5/2000 | Roberts ....................... 359/181 |

FOREIGN PATENT DOCUMENTS

| | | | |
|---|---|---|---|
| 0715191A2 | 11/1995 | (EP) | ............... G02B/6/16 |
| 794599A2 | 3/1997 | (EP) | ............... H01S/3/06 |

OTHER PUBLICATIONS

Patent Abstracts of Japan, vol. 018, No. 687 (E–1651), Dec. 26, 1994 & JP 06 276154 A (Nippon Telegr & Teleph Corp), Sep. 30, 1994.

Weihs G et al: "All–Fiber Three–Path Mach–Zehnder Interferometer" Optics Letters, US Optical Society of America, Washington, vol. 21, No. 4, Feb. 15, 1996.

Kyo Inoue et al: "Tunable Gain Equalization Using a Mach–Zehnder Optical Filter in Multistage Fiber Amplifiers" IEEE Photonics Technology Letters, US, IEEE Inc. New York, vol. 3, No. 8, Aug. 1, 1991.

* cited by examiner

Primary Examiner—Frank G. Font
Assistant Examiner—Layla Lauchman
(74) Attorney, Agent, or Firm—Lee, Mann, Smith, McWilliams, Sweeney and Ohlson

(57) ABSTRACT

An optical equalizer comprises a plurality of serially concatenated filter elements the phase and modulation depth of which can be individually tuned. The filter elements are tuneable in order to generate a desired optical equalization function. Each of the filter elements is a three arm interferometer and each is fabricated utilizing integrated waveguide technology.

9 Claims, 6 Drawing Sheets

EFFECT OF SIMPLE TWO ARM MACH ZEHNDER INTERFEROMETER

OPTICAL EQUALIZER

This invention relates to the equalisation of optical signals in an optical communications system and in particular but not exclusively to the equalisation of wavelength division multiplexed optical signals.

BACKGROUND TO THE INVENTION

The control of optical power levels in optical communications systems is critical in obtaining optimum performance since the power level should be sufficient to establish a signal to noise ratio which will provide an acceptable bit error rate but without the power level exceeding a level at which limiting factors such as the onset of non-linear effects result in degradation of the signal. In wavelength division multiplexed (WDM) transmission, it is desirable to maintain each of the power levels of the individual wavelength components at substantially the same level.

The inventor has disclosed in U.S. Pat. No. 5,513,029 a method of monitoring component power levels in WDM transmission using orthogonal low frequency dither signals and controlling component signal power to maintain optimum performance.

It is also known from GB2314714A that an imbalance of component signal powers in a WDM transmission is likely to occur at an optical amplifier stage, as used to boost signal power at stages in a long distance transmission, utilising optical amplifiers such as erbium doped fibre amplifiers. Such amplifiers have a non-uniform gain characteristic as a function of wavelength which is variable in dependence on the amplifier gain, this change in gain characteristic consequent on change of gain being commonly referred to as dynamic gain tilt.

There is therefore a need to provide optical filtering which is adaptive and which can be used in conjunction with optical amplifiers, or otherwise, in order to maintain a preferred spectral profile of an optical signal.

It is known from Huang et al, IEEE Photonics Technical Letters, September 1996 pp 1243–1245, to provide an acousto-optic tunable filter for dynamic equalization of channel powers. A disadvantage of such a method is that the filters suffer from polarisation sensitivity and severe channel cross talk.

It is also known from Gobel et al, IEEE Photonics Technology Letters, March 1996, pp 446 to 448, to provide a WDM power level compensator in which demultiplexed channels are subject to power control in respective erbium doped waveguides. A disadvantage of this arrangement is that significant distortion of the modulated optical signal occurs.

It is also known from Madsen et al, IEEE Journal of Lightwave Technology, March 1996, pp 437 to 447, to provide fixed (non-adaptive) filters using a sequence of concatenated Mach-Zehnder interferometers in a planar waveguide structure. Such structures require lengths which are difficult to fit onto a single planar waveguide structure and which have an inherent high insertion loss.

Parallel structures on planar waveguides are known from Dragone, IEEE Photon Technology Letters, September 1991, pp 812 to 815, which provide non-adaptive filtering with output at a single wavelength.

It is also disclosed by S. Day in co-pending application U.S. Ser. No. 08/997,752 to provide a variable optical attenuator by means of localised heating of a waveguide.

Yamada et al, Electron Letters 1995, 31, pp 360 to 361, discloses a multiplexer using planar waveguide technology and in which a waveguide array is provided with heating strips for each waveguide in order to compensate for phase errors occurring during fabrication. After such compensation, light components passing through the arrayed waveguides are delayed by respective amounts which differ by a constant phase difference between adjacent waveguides to that recombination in a star coupler at the output of the waveguides is dispersive in wavelength to provide separation of the WDM channels, this arrangement thereby being termed an arrayed waveguide grating.

The assignee's co-pending application U.S. Ser. No. 09/158,684, discloses an optical equaliser for a wavelength division multiplexed optical signal in an optical communications system utilises an array of parallel waveguides using planar waveguide technology. Waveguides having a range of different lengths have transmission controlled respectively in amplitude and/or phase in accordance with parameters calculated from a Fourier transform of an input frequency characteristic. The equaliser has application to optical systems having line amplifiers where fibre amplifiers result in gain tilt, the equaliser allowing gain tilt to be corrected.

This equaliser utilises a parallel filtering technique in which a complex filtering function is provided through a multi-branch interferometer. Incoming light is directed into a 1:M optical splitter and divided between a number of parallel waveguides with different optical path lengths then subsequently recombined at an M:1 combiner. The multiplicity of different path lengths can be thought of as generating a suite of periodic parallel filtering functions. In this device more waveguides generally result in finer spectral detail to be synthesised, and better flattening of spectra. The relative optical phases of each path can be adjusted to control the phase and amplitude of the periodic filtering functions, so that complex filter shapes can be synthesised.

However, 1:M splitters and combiners are increasingly difficult to build, for large values of M, in integrated waveguide technology. This impacts the yield and cost of the manufacturing process for such devices significantly. Also, the average insertion loss of the device increases with number of waveguides, because power is necessarily lost at the 1:M combiner; furthermore the loss is concentrated in a single device, which has a greater impact on optical system SNR (Signal to Noise Ratio) than distributed losses.

Furthermore, the relative phases of all the periodic functions must be controlled, even in situations where reduced spectral detail is required—i.e. it is not possible to use just half the device. Therefore, complexity, scalability and the localised losses and their affect on SNR are significant problems with this device.

There remains a need to provide an improved optical equaliser, particularly for use in the context of correcting gain tilt in optical amplification stages of a communications system.

SUMMARY OF THE INVENTION

It is an object of the present invention to provide an easily scalable optical equalisation to at least partially compensate for the effects of gain tilt in optical amplifiers.

It is a further object of the present invention to provide an adaptive optical equaliser using planar waveguide technology, without the fabrication problems of prior art devices.

According to a first aspect of the present invention there is provided an optical equaliser comprising a plurality of serially concatenated filter elements the phase and modulation depth of which can be individually tuned, the filter elements being tunable in order to generate a desired optical equalisation function.

Preferably, each filter element is a three arm interferometer.

Preferably, the filter elements are fabricated utilising integrated waveguide technology.

According to a second aspect of the present invention there is provided a method of optical equalisation of an optical signal, for use in an optical communications system, comprising the steps of:

filtering the optical signal transmitted by said optical element in the optical communications system through a plurality of serially concatenated, variable modulation depth and variable phase, periodic filters elements, and tuning the filter elements in order to generate a desired optical equalisation function.

Preferably, the individual filter elements are distributed at remote locations within a device the optical output of which is to be equalised.

Preferably, individual filter elements can be added to the equaliser to improve the gain flattened produced by the equaliser.

According to a further aspect of the present invention there is provided an optical amplifier including an amplifying element and an optical equaliser comprising a plurality of serially concatenated, variable phase, variable modulation depth, periodic filters each of which is tunable in order to optimise the optical equalisation of an optical signal transmitted by said amplifying element.

Preferably, individual filter elements are distributed at remote locations within the amplifier.

According to a further aspect of the present invention there is provided an optical communications system including an optical equaliser comprising a plurality of serially concatenated, variable phase, variable modulation depth, periodic filters each of which may be individually tuned in order to optimise optical equalisation of an optical signal transmitted by an optical element in the optical communications system.

Preferably, individual filter elements are distributed at remote locations within the device the optical output of which is to be equalised.

Preferred embodiments of the present invention will now be described by way of example only.

Figure 1:
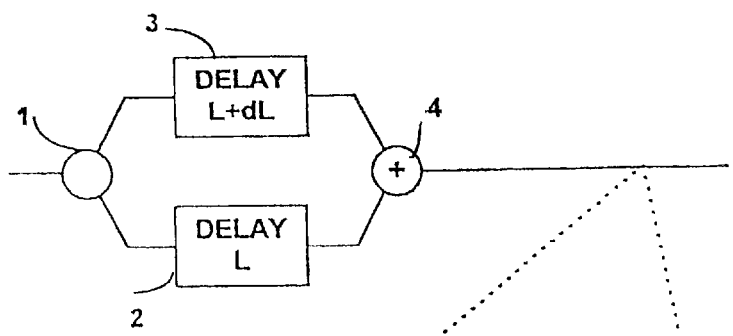
FIGS. 1 and 1a are schematic representation of the effect of a two arm Mach-Zener interferometer.
Figure 1A:
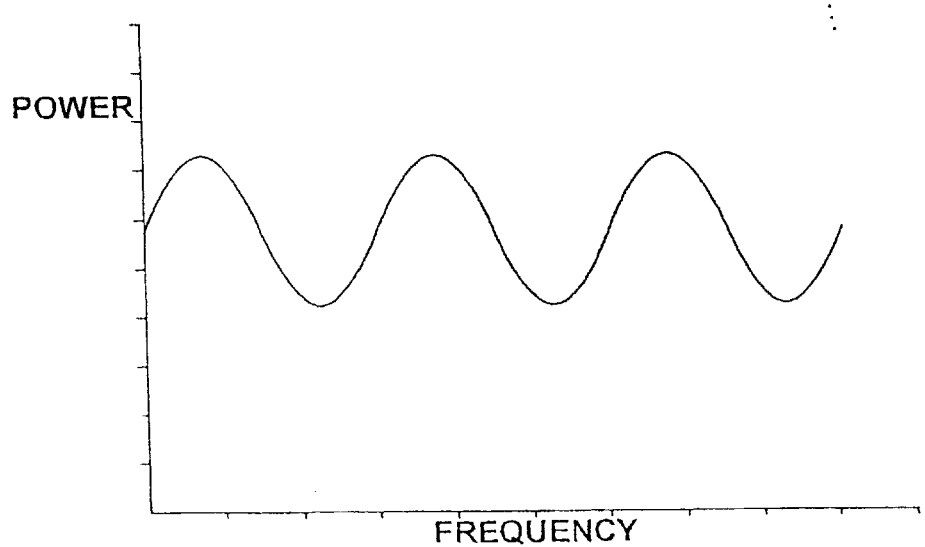

The effect of a simple two arm Mach-Zener interferometer is illustrated in FIG. 1 in which a splitter 1 divides an incoming signal into first and second portions, the first portion being passed through a delay 2 provided by a length of waveguide L, the remaining portion being passed through a second delay 3 represented by a waveguide of length L+ dL, and the outputs from delays 2 and 3 being additionally combined in a combiner 4. The combined output is modulated in frequency space as illustrated graphically in FIG. 1a, the modulation being sinusoidal with a period which is inversely proportional to dL.

It should be noted that the path length difference of a Mach-Zener decides the periodicity of the filter. When you change the path length difference you are actually changing the periodicity (or free spectral range) of the filter. However since we are only observing a small section of the spectrum (approx. 1530–1570 nm), then the very small changes in periodicity appear as large changes in the centre wavelength of the filter.

Therefore, in order to tune the centre wavelength of the filter you are actually changing the period very slightly, fortunately it has been realised by the applicants that the effect is very small The three arm interferometer has the additional advantage of a tuneable modulation depth, as will now be discussed. A simplified representation of the output (OP) of the three arm interferometer can be produced by the equation below, when B is the amplitude of a signal in each of the outer arms of the interferometer (when these are equal) and A is the amplitude of the signal in the inner arm of the interferometer. $\Delta\emptyset_1$ is the phase difference between the first outer arm and the inner arm of the interferometer and $\Delta\emptyset_2$ is the phase difference between the second outer arm and the inner arm of the interferometer.

$$OP = A^2 + 2B^2\left(1 + \cos\left(\frac{\Delta\phi_1 - \Delta\phi_2}{2}\right)\right) + \\ 2AB(2\cos(kL(\Delta\phi_1 + \Delta\phi_2)))\cdot\cos\left(\frac{\Delta\phi_1 - \Delta\phi_2}{2}\right)$$

The first two terms in the equation give a continuous term and a term associated with the modulation depth of the interferometer. The third term, which relates to the average phase in the outer arms of the interferometer, gives the wavelength position of the periodic term "kL". The final term, which relates to the phase difference between the signals in the outer arms of the interferometer gives the depth of the periodic function. Thus the three arm interferometer provides a filtering function which is both amplitude and wavelength tunable, by controlling adjustment of the phase of signals in two or more arms of the interferometer.

Figure 2:
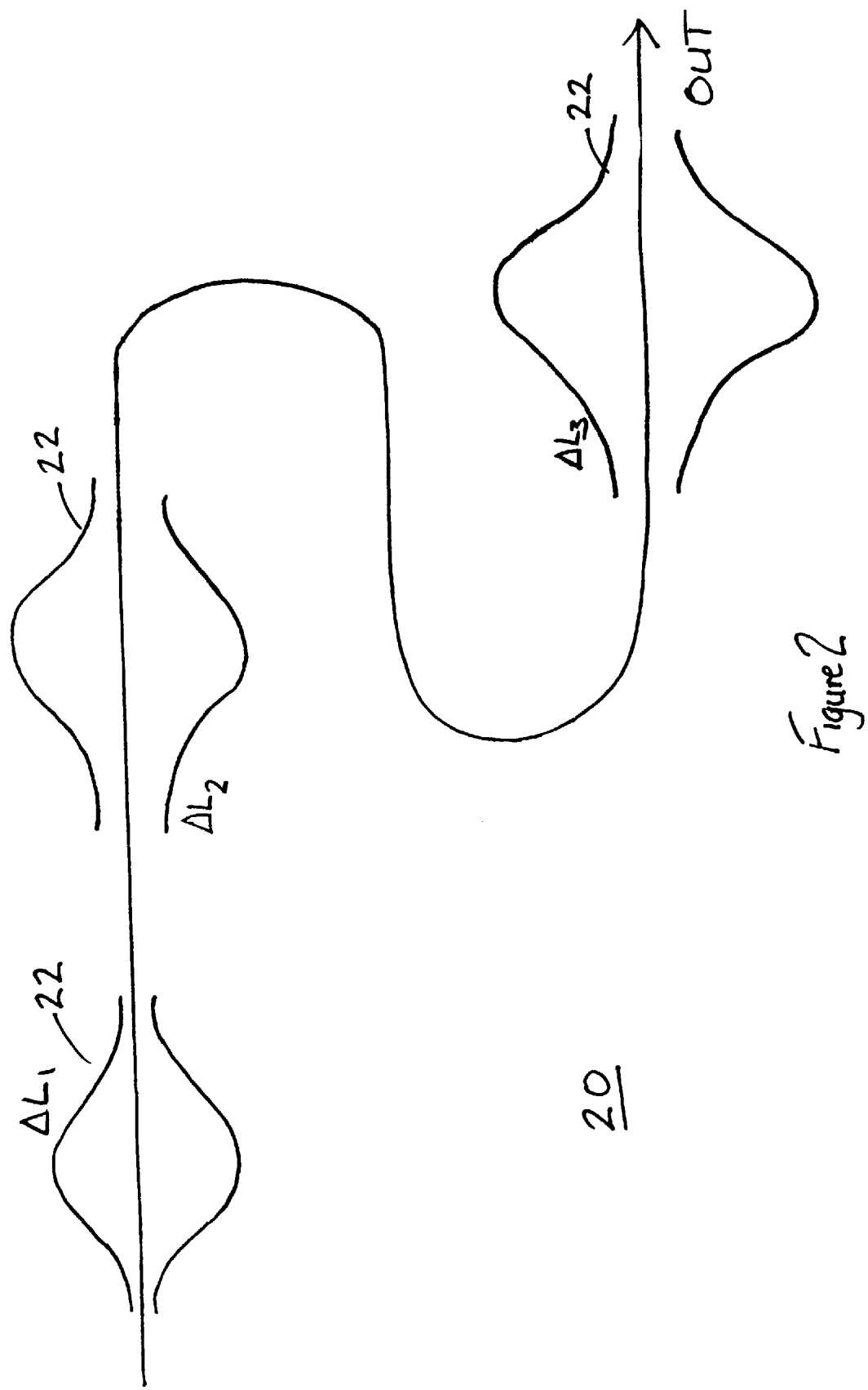
FIG. 2 is a schematic representation of an optical equaliser in accordance with the present invention.

FIG. 2 illustrates an optical equaliser 20 in accordance with the present invention comprising three serially concatenated filter elements 22, in the form of three arm interferometers. The phase and modulation depth of the filter elements 22 can be individually tuned, the filter elements being tunable in order to generate a desired optical equalisation function.

The filter elements are fabricated utilising integrated waveguide technology, for example silica on silicon technology as described in S. Day's co-pending application U.S. Ser. No. 08/997,752 which is a high volume, low cost manufacturing technology. Waveguides and couplers are formed by using appropriate doping of regions of the substrate to alter the local refractive index and thereby define optical waveguides and waveguide components such as couplers. Phase adjusters can be formed for individual sections of waveguide by using localised heating elements.

Figure 3A:
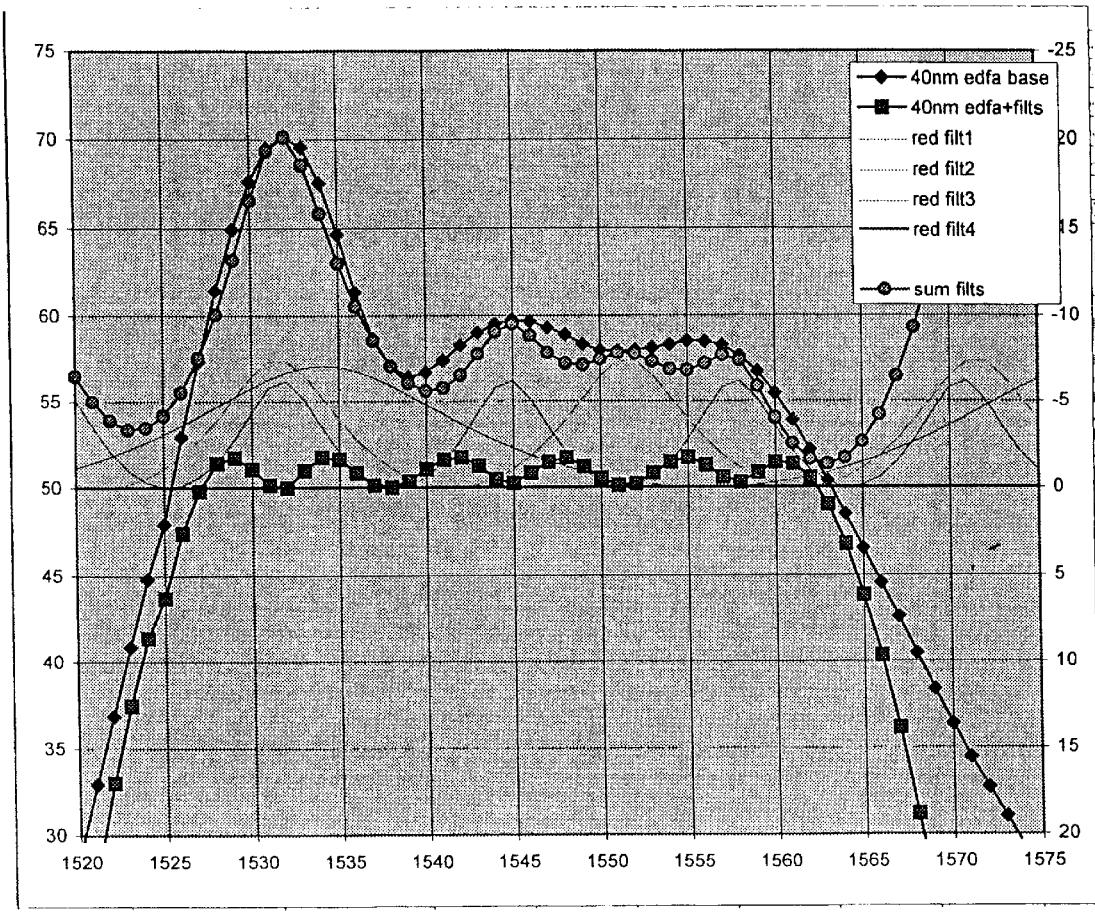
FIG. 3A is a graphical representation of the output a three element optical equaliser in accordance with the present invention.

FIG. 3A illustrates the output of an equaliser 20 with three filter elements 22. Typically the use of three filter elements allows ripple in a spectrum to be controlled to ±0.9 dB over the conventional 33 nm window in an Erbium Dopped Fibre Amplifier (EDFA) with 50 dB internal gain. The example illustrated in FIG. 3A illustrates 1.74 dB ripple.

Figure 3B:
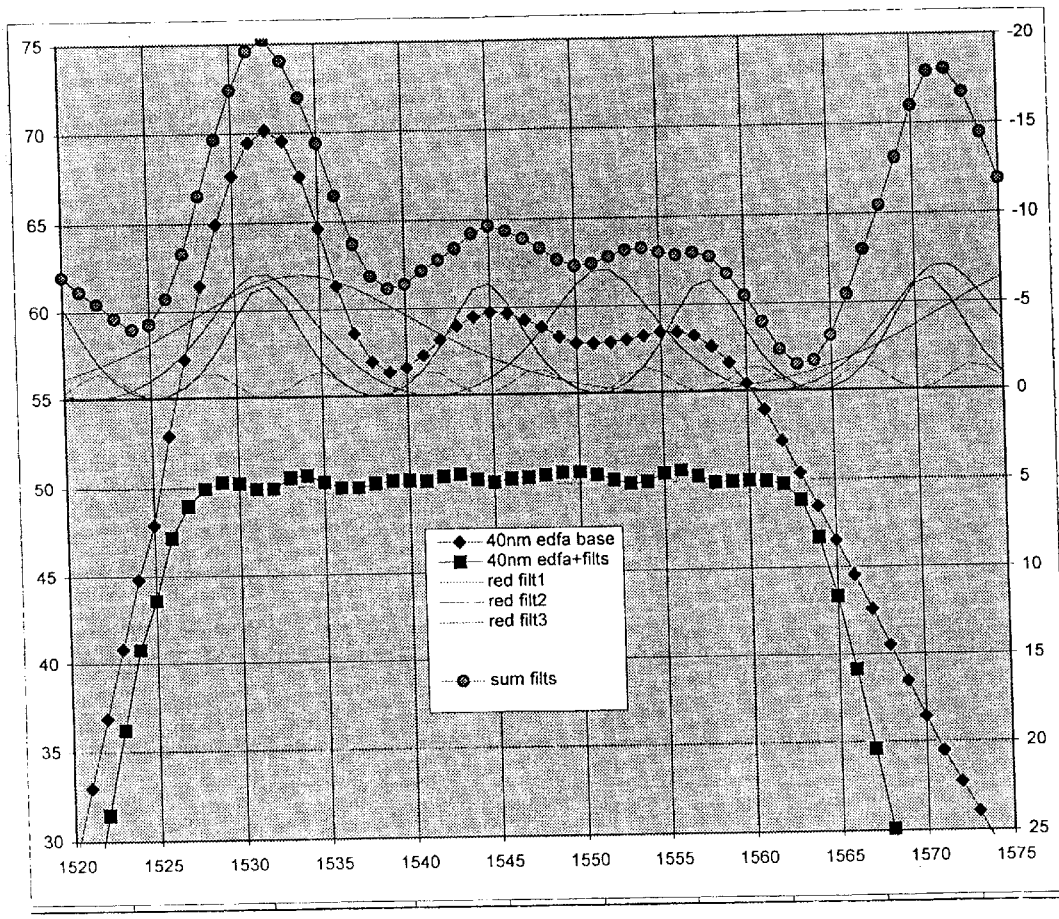
FIG. 3B is a graphical representation of the output a four element optical equaliser in accordance with the present invention.

FIG. 3B illustrates the output of an equaliser 20 with four filter elements 22. Normally, the addition of a fourth filter element 22 can reduce the ripple on a spectrum to ±0.4 nm over the same band. In the example illustrated in FIG. 3B the ripple is of the order of 0.72 dB.

Figure 3C:
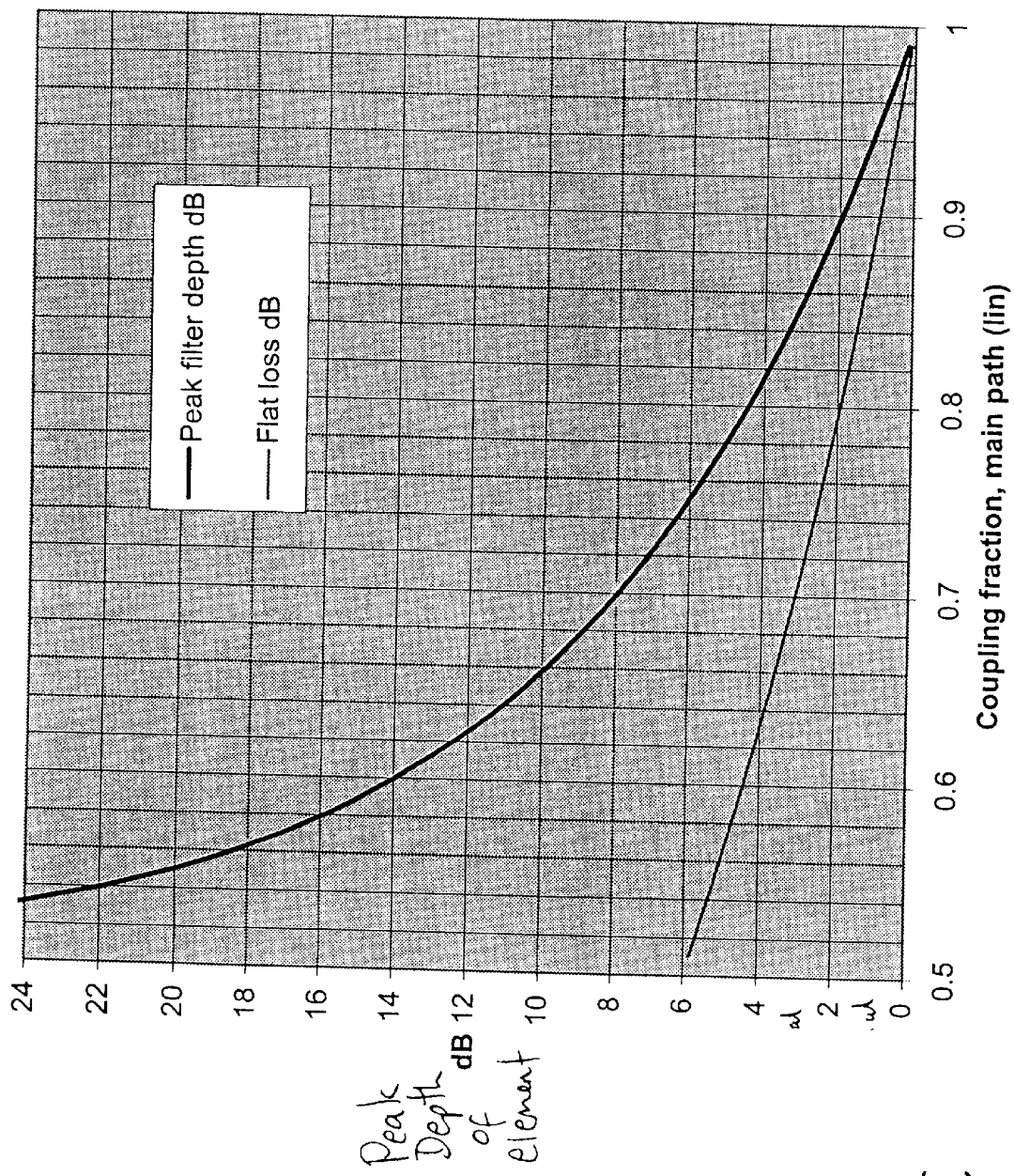
FIG. 3C is a graphical illustration of the relationship between peak depth and flat loss in an optical equaliser in accordance with the present invention.

FIG. 3C illustrates the relationship in a three arm interferometer between peak filter depth and flat loss. This figure illustrates that with an interferometer in accordance with the present invention a peak filter depth of 8 dB is sufficient to flatten up to 50 dB internal gain in an EDFA.

When in use, in an optical communications system, the equaliser 20 equalises an optical signal by filtering the optical signal transmitted by an optical element, such as an amplifying element 24, in the optical communications system, through a plurality of serially concatenated, variable modulation depth and variable phase, periodic filters elements 22. The elements 22 are tuned in order to generate a desired optical equalisation function.

The 3 arm interferometer is tuned by adjusting optical phase in two or more of the arms, preferably by using heating elements (as disclosed by S. Day in co-pending application U.S. Ser. No. 08/997,752 to provide a variable optical attenuator by means of localised heating of a waveguide). The three important characteristics are the wavelength periodicity, the depth (the difference in the attenuation at a peak and a trough of the filter characteristic and the wavelength position.

The periodicity is set at the fabrication stage by the optical path difference between the central and the outer paths; a shorter path length difference gives a longer periodicity filter, and vice versa. The periods are chosen to approximately match periodic components of the spectrum to be filtered, for example, for an EDFA gain spectrum, shown in FIG. 3B the periods of the 4 filters shown were approximately 48 nm, 24 nm, 12 nm, and 6 nm. For different applications, other sets of filter periods will be more appropriate, and in some cases non-harmonic period filter sets will give better results.

The depth of the filter characteristic is controlled by the differential phase between the two outer paths.

The wavelength position of the filter characteristic is controlled by the average phase difference between central path and outer paths. For example, one design of 3 arm interferometer with two localised heaters, one on one of the outer waveguides, and one on the central waveguide, filter depth can be tuned by controlling the heater current fed to the outer path heater, and the wavelength position of the filter characteristic can be tuned by controlling the heater current fed to the central path heater.

The required settings for depth and wavelength position of each filter element can be determined from analysis of the optical spectrum to be filtered, and the desired output spectrum. The difference between actual input and desired output spectra gives the composite filter shape required. For example, U.S. Pat. No. 5,513,029 discloses a method of monitoring component power levels in WDM transmission using orthogonal low frequency dither signals, which can also be used to monitor gain or power spectra of a WDM system. The depths and wavelength positions for each of the periodic filters can then be determined by a number of methods, such as by Fourier analysis of the desired filter shape, or computational correlation of the required composite filter shape with each filter's known period, to extract depth and wavelength position of each element.

Alternatively, a simpler 'trial and error' approach can be used which minimises the error between the actual filtered spectrum and the desired spectrum by incrementing the depths and wavelength positions of the filters sequentially.

Alternatively, for a specific amplifier design, gain tilt and gain spectra are well defined predictable quantities, and so a 'dead reckoning' approach which just monitors the optical gain of the amplifier can be used to predict the gain spectrum, and therefore the depth and wavelength position of the individual filter components.

Individual filter elements can be added to the equaliser to improve the gain flattened produced by the equaliser.

Figure 4:
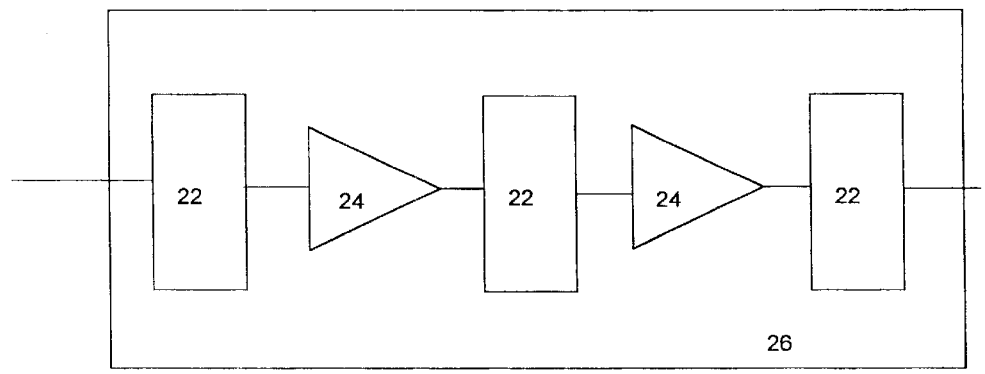
FIG. 4 is a schematic representation of an optical amplifier in accordance with the present invention.

FIG. 4 schematically illustrates an optical amplifier 26 in accordance with the present invention. The amplifier 26 includes two amplifying elements 24 and an optical equaliser. The equaliser comprises three concatenated, periodic filter elements 22, as described above. The filter elements 22 are distributed throughout the amplifier 34 in order to reduce losses as also discussed above.

Figure 5:
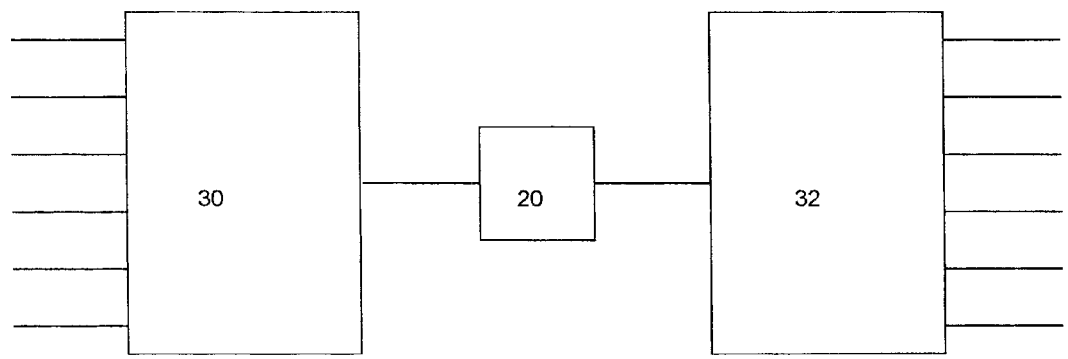
FIG. 5 is a schematic representation of an optical communications system in accordance with the present invention.

FIG. 5 illustrates an optical communications system 28 including an optical equaliser 20 as discussed above. The system 28 also includes a multiplexer 30 and a demultiplexer 32. The multiplexer 36 and demultiplexer 38 are arranged to enable WDM communication. These elements 36, 38 are connected by optical fibres 34 via the optical equaliser 20.

The foregoing description has been limited to specific embodiment of the invention. It will be apparent to a person skilled in the art, however, that variations and modifications may be made to the invention without departing from the scope or spirit of the present invention as claimed.

What is claimed is:

1. An optical equaliser comprising a plurality of serially concatenated filter elements the phase and modulation depth of which can be individually tuned, the filter elements being tunable in order to generate a desired optical equalisation function and wherein each filter element is a three arm interferometer.

2. The optical equaliser of claim 1, wherein the filter elements are fabricated utilising integrated waveguide technology.

3. A method of optical equalisation of an optical signal, for use in an optical communications system, comprising the steps of:

filtering the optical signal transmitted by said optical element in the optical communications system through a plurality of serially concatenated, variable modulation depth and variable phase, periodic filters elements, and tuning the filter elements in order to generate a desired optical equalisation function, wherein each filter element is a three arm interferometer.

4. The method of claim 3, wherein the individual filter elements are distributed at remote locations within a device the optical output of which is to be equalised.

5. The method of claim 3, wherein individual filter elements can be added to the equaliser to improve the gain flattened produced by the equaliser.

6. An optical amplifier including an amplifying element and an optical equaliser comprising a plurality of serially concatenated, variable phase, variable modulation depth, periodic filters each of which is tunable in order to optimise the optical equalisation of an optical signal transmitted by said amplifying element and wherein each filter element is a three arm interferometer.

7. The optical amplifier of claim 6, wherein the individual filter elements are distributed at remote locations within the amplifier.

8. An optical communications system including an optical equaliser comprising a plurality of serially concatenated, variable phase, variable modulation depth, periodic filters each of which may be individually tuned in order to optimise optical equalisation of an optical signal transmitted by an optical element in the optical communications system, wherein each filter element is a three arm interferometer.

9. The communications system of claim 8, wherein the individual filter elements are distributed at remote locations within the device the optical output of which is to be equalised.

* * * * *

UNITED STATES PATENT AND TRADEMARK OFFICE
CERTIFICATE OF CORRECTION

PATENT NO. : 6,321,000 B1
DATED : November 20, 2001
INVENTOR(S) : King

It is certified that error appears in the above-identified patent and that said Letters Patent is hereby corrected as shown below:

<u>Title page,</u>
Item [22], should read -- December 10, 1998 --

Signed and Sealed this

Twenty-sixth Day of November, 2002

Attest:

Attesting Officer

JAMES E. ROGAN
*Director of the United States Patent and Trademark Office*